Dec. 24, 1935.         J. H. DOTTERRER         2,025,381
                     LOCOMOTIVE DRIVE FRAME
                     Filed Aug. 10, 1934        2 Sheets-Sheet 1
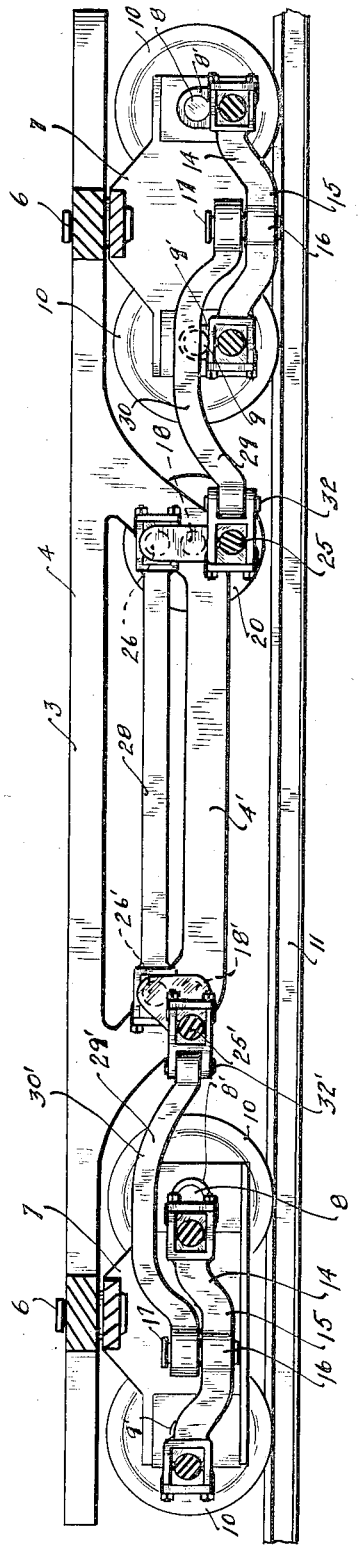
Inventor
John H. Dotterrer
By Clive Hartson
Attorney Dec. 24, 1935. J. H. DOTTERRER 2,025,381
LOCOMOTIVE DRIVE FRAME
Filed Aug. 10, 1934 2 Sheets-Sheet 2
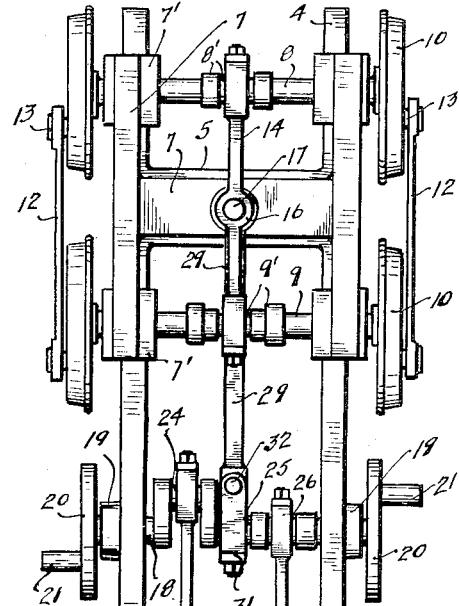
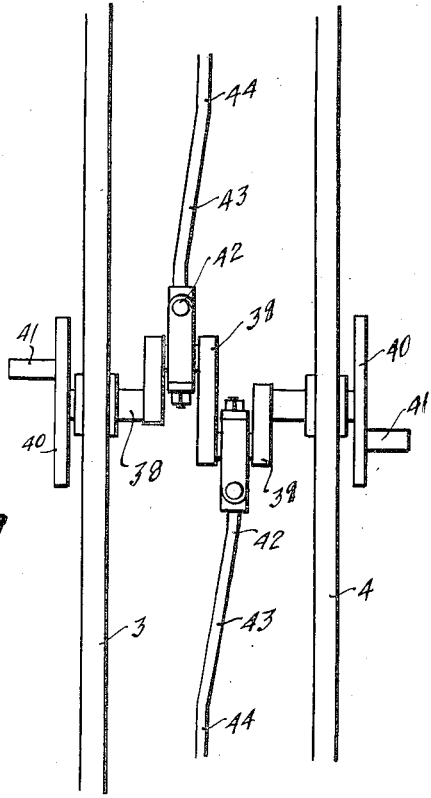
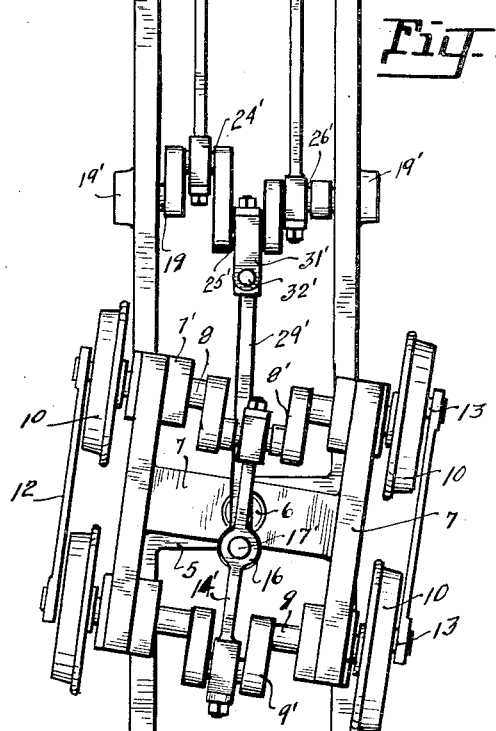
Inventor
John H. Dotterrer Patented Dec. 24, 1935

2,025,381

UNITED STATES PATENT OFFICE 2,025,381

LOCOMOTIVE DRIVE FRAME

John H. Dotterrer, Ostrander, Wash.

Application August 10, 1934, Serial No. 739,288

6 Claims. (Cl. 105—99)

My invention relates to improvements in the propelling or driving mechanism of locomotives of the truck or bogie type and analogous driven vehicles. The primary object of the invention is directed toward providing a locomotive able to travel on curves having short radii.

The invention consists in providing a locomotive with trucks or bogies which swing upon an axis with regard to the locomotive or its frame which permits the trucks to turn in accordance with sharp curvatures in the track upon which they travel. The trucks are preferably provided with four track wheels two on each side. The wheels are carried upon crank axles mounted in the frame of the trucks. A connecting rod connects the cranks of the two axles. This connecting rod is located in line with the pivotal center or swivel of the truck. Driven crank shafts are mounted in the locomotive frame, and these are connected by connecting rods to the rods connecting the crank axles. The connection between the rods is beneath and in axial alignment with the pivotal connection between truck and frame. A vertical pivot connection is provided, thus allowing the trucks to turn with the curvature of the track.

As a result of the foregoing construction a more direct connection is provided between the driven wheels and the driving means thus avoiding substantial power loss. Gears and loose connections are avoided. Speed reduction through gear mechanisms and the like are avoided. Simplicity in construction and operation is provided.

In the drawings:—

Figure 1 is a side elevation of a locomotive having my invention incorporated therein.

Figure 2 is a side sectional elevation of a locomotive frame and wheel trucks.

Figure 3 is an inverted plan view of the locomotive frame and wheel trucks with parts in section.

Figure 4 is a fragmentary plan of a modified driving means.

Figure 5 is a side sectional elevation of a connecting rod bearing.

Figure 1 illustrates my invention incorporated in a railway locomotive consisting of the boiler 1, driving cylinders 2 which are operatively connected by means of connecting rods to a hereinafter identified crank shaft.

Supporting the boiler is a frame 3 consisting of two side members 4 and cross members 5. Beneath the side members are suspended portions or extensions 4'. Cross members 5 have an intermediate swivel bearing for the swiveling pin 6. Swiveled to the pin 6 is a truck frame 7. Mounted within suitable bearings 7' in the truck frames are the crank shafts or axles 8 and 9 respectively having cranks 8' and 9'. The cranks 8' and 9' are centered between the track wheels at the ends of the axles, and are within the longitudinal center-line of frame and vehicle body.

Track wheels 10 are mounted to the outer ends of the axles 8 and 9, and are suitably flanged to travel on the rails 11. Thus far it will be seen that each truck is provided with two track wheels each side thereof. Connecting the wheels each side of the truck by means of the crank pins 13 are the connecting rods 12, the crank pins on both pairs of connected whels and the cranks 8' and 9' are quartered with regard to each other to avoid dead centers.

Connecting the cranks 8' and 9' is a connecting rod 14 having a downward central offset portion 15 and an intermediate enlargement 16 for receiving the pin 17.

A pair of crank shafts 18 and 18' are mounted in suitable bearings 19 and 19' in the frame extension 4'. Disks 20 having crank pins 21 are mounted to the ends of shaft 18, the pins being quartered with regard to each other to avoid a common dead center. The pins 21 are connected by connecting rods 22 to the piston rods 23 operating from cylinders 2. The shafts 18 and 18' are respectively supplied with three cranks 24, 25 and 26, and 24', 25' and 26'. Cranks 24 and 26 are quartered with regard to each other, and cranks 24' and 26' are likewise quartered, while cranks 24 and 24', and 26 and 26' are arranged to turn in unison, and between the two first is connected the connecting rod 27, and between the latter two, the connecting rod 28. Thus it will be seen that reciprocation of piston rod 23, through connecting rod 22, is transformed into rotation of shaft 18, and that this shaft, by reason of the connecting rods 27 and 28 extends rotation to the shaft 18'. Hence it will be seen that such rotary motion through the cranks 25 can be transformed into reciprocative motion and that such reciprocative motion through the medium of suitable connecting rods can be extended to the connecting rods 14 to be retransformed into rotary motion in the track wheels 10. For this purpose there is provided the connecting rods 29 and 29'. These rods, as will be seen are provided with an intermediate offset portion 30 and 30' respectively. This is to enable them to clear the ends of the connecting rods 14. These rods have one end connected by means of bearing members 31 and 31' to the cranks 25 and 25'. The bearing members are not solid with the connecting rods, but are connected therewith by means of the swivel pins 32 and 32'. The other ends of the rods are connected to the pins 17 in the member 14. Thus it will be seen that as the shafts 18 and 18' are rotated, reciprocation is extended to the rods 29, 29', and is continued in the rods 14 where it is transformed into rotation of the axles 8 and 9 thus driving the wheels 10 and thereby propelling the locomotive.

In the foregoing construction the connection and operation of the connecting rods 29, 29' with the connecting rods 14 is along the center line of the locomotive, the connecting rods 14 being midway between the wheels 10 on each side of a truck, and when the trucks swivel (as shown by the truck to the left in Figure 3) there is a minimum of departure from the center line at the point of connection between connecting rods 29, 29' and pin 17. Lateral swing of rods 29, 29' is taken care by the swivel connection 32, 32'.

In order to meet a slight increase of the distance between centers of the cranks 25, 25' and the pins 17 during the period the trucks are out of alignment, an adjustable bearing can be provided for the rods 29, 29' in their connection to the pins 17. This is shown in Figure 5. This consists of a seat 34, which carries the bearing members 35. These are slidable back and forth to a limited extent, their slidability however being limited and controlled by spring members 36.

A variation in the construction described is shown in Figure 4. Instead of using two shafts 18, 18' as previously described, but one is used, the crank shaft 38, which is provided with two cranks 39, crank disks 40 and crank pins 41 which are connected by means of connecting rods to the piston rods of the engine cylinders. To the cranks 39 are connected the connecting rods 42. These have offset portions 43 which provide for carrying the remaining portions 44 in line to connect with the pins 17; this connection is not shown as it will be readily understood.

The locomotive just described, though suitable for various uses, is particularly adaptable for logging and industrial operations wherein the rail lines are plentifully supplied with curves and other irregularities. Though the description of the invention has been somewhat confined to locomotives, it is to be understood that it is adaptable to other self propelled vehicles traveling upon tracks or trackways.

While a specific form of the improvement has been described and illustrated herein, it is desired to be understood that the same may be varied, within the scope of the appended claims, without departing from the spirit of the invention.

Having described my invention, I claim—

1. A railway locomotive including its frame, trucks having a pair of crank axles carrying track wheels swivelly supporting each end of the frame, a connecting rod connected between the cranks of each pair of crank axles, a vertical pivot intermediate the length of the connecting rod, a driving crank shaft, and a connecting rod connected between the vertical pivot and a crank of the driving crank shaft.

2. In a locomotive adapted for negotiating curves having less than normal radii, the main frame thereof and a pair of trucks supporting the frame, the trucks having each a pair of crank axles to which track wheels are mounted, a connecting rod connecting cranks on each pair of axles, the connecting rod being centered with respect to the centerline of the frame, the trucks having a swivel connection to the frame, a bearing member on said connecting rod situated midway between its crank connections, a driving crank shaft mounted in the frame, and a connecting rod connected between a crank of said crank shaft and said bearing member.

3. A locomotive including its frame, a pair of trucks swivelly supporting the frame, said trucks each having a pair of crank axles upon which are mounted track wheels, a connecting rod connected between the cranks of each pair of axles, the connecting rod being positioned beneath the swivel connection between truck and frame, a bearing member on said connecting rod situated midway between its crank connections, a driving crank shaft mounted in the frame, and a connecting rod connected between the crank of said crank shaft and said bearing member.

4. A locomotive including an underbody, trucks each having a pair of crank axles to which are mounted track wheels supporting the underbody, each truck having a central swivel connection with the underbody, a rod connecting cranks of each pair of axles and operating beneath the swivel connection, a bearing pin projecting upwardly from the rod, said pin when the track wheels rotate moving back and forth beneath the swivel connection, a driving member, and a member reciprocated by said driving member connected to said pin.

5. In a railway vehicle of the class specified, a frame, trucks swivelled to and supporting the frame, a pair of crank axles carried by each truck, track wheels mounted thereto, the cranks of the crank axles being positioned intermediate the wheels and within the longitudinal center line of the vehicle, a connecting rod operably connected between the cranks of the axles, a driving crank shaft mounted in the frame, and a connecting rod connecting between the first mentioned connecting rod and a crank of said shaft.

6. A locomotive having an underbody consisting of a frame, a truck swivelly supporting each end of the frame, each truck having a pair of crank axles having track wheels mounted thereon, the cranks of the crank axles being positioned intermediate the wheels and within the longitudinal centerline of the under body, a connecting rod connecting the cranks of the axles of each truck, a pair of driving shafts mounted in the frame and connected to rotate in unison, a connecting rod connected between a crank of one of said crank shafts and one of the first mentioned connecting rods, and a connecting rod connected between a crank of the other crank-shaft and the other of the first mentioned connecting rods.

JOHN H. DOTTERRER.